United States Patent [19]

Allan et al.

[11] Patent Number: 5,520,870
[45] Date of Patent: May 28, 1996

[54] METHODS AND APPARATUS FOR THE CONTINUOUS FORMATION OF AN EXTRUDED PRODUCT

[75] Inventors: Peter S. Allan, Chalfont St. Peter; Michael J. Bevis, Uxbridge; Christopher D. Bartlett, East Grinstead, all of England

[73] Assignee: British Technology Group Limited, London, England

[21] Appl. No.: 347,368

[22] PCT Filed: May 28, 1993

[86] PCT No.: PCT/GB93/01122

§ 371 Date: Dec. 2, 1994

§ 102(e) Date: Dec. 2, 1994

[87] PCT Pub. No.: WO93/25372

PCT Pub. Date: Dec. 23, 1993

[30] Foreign Application Priority Data

Jun. 8, 1992 [GB] United Kingdom .................. 9212093
Sep. 21, 1992 [GB] United Kingdom .................. 9219886

[51] Int. Cl.⁶ .................................................. B29C 53/02
[52] U.S. Cl. .............................. 264/210.200; 264/209.3; 264/281; 264/285; 264/339; 425/145; 425/325; 425/327
[58] Field of Search ............................. 264/285, 339, 264/210.2, 209.3, 209.4, 281, 167; 425/325, 326.1, 381, 327, 145

[56] References Cited

U.S. PATENT DOCUMENTS

| 2,422,953 | 6/1947 | Davies et al. | |
|---|---|---|---|
| 3,207,827 | 9/1965 | Kuehnle | 264/281 |
| 3,497,588 | 2/1970 | Williams et al. | 264/209.3 |
| 3,551,545 | 12/1970 | Overdiep | 425/381 |
| 3,748,077 | 7/1973 | Williams et al. | |
| 3,912,436 | 10/1975 | Bailly | 425/381 |
| 4,209,476 | 6/1980 | Harris | 264/40.7 |
| 4,359,446 | 11/1982 | Levens | |
| 4,361,530 | 11/1982 | Peer | 264/210.2 |
| 4,749,535 | 6/1988 | Matsuda | 264/210.2 |
| 4,777,005 | 10/1988 | Miller | 264/285 |
| 4,906,171 | 3/1990 | Miller | 425/381 |
| 4,929,167 | 5/1990 | Pepper | 264/209.4 |
| 5,167,891 | 12/1992 | Dijkman et al. | 264/281 |

FOREIGN PATENT DOCUMENTS

| 0430409 | 6/1991 | European Pat. Off. | |
|---|---|---|---|
| 3737453 | 5/1988 | Germany . | |
| 42-4076 | 2/1967 | Japan | 264/281 |
| 3-121828 | 5/1991 | Japan | 264/210.2 |
| 253320 | 11/1948 | Switzerland . | |
| 9008024 | 7/1990 | WIPO . | |

OTHER PUBLICATIONS

Patent Abstracts of Japan, vol. 8, No. 73 (M–287)(1510) 5 Apr. 1984 & JP, A,58 220 717 (Toyoda Gosei K.K. ) 22 Dec. 1983.

Maurice Bowtell: "Iddon Introduces Moving Head Extruder for Automated Hosemaking", Elastomerics, Mar. 1986 pp. 38–39.

*Primary Examiner*—Jeffery R. Thurlow
*Attorney, Agent, or Firm*—Cushman, Darby & Cushman

[57] ABSTRACT

A method and apparatus for continuously extruding a product, and forming it into a bend by applying a force to it at a point of application downstream of where its surface becomes solid. The force has a transverse component relative to the die axis, and performs work upon the extruded material, extra to the work that has already been performed to extrude it. Non-contact members of applying the force are described, and various ram-type contacting members are illustrated. Alternative means of operation are described in which the point of application of the force to the extrudate during bending varies relative both to the extrudate and to the die, relative to the extrudate only, and relative to the die only. Means to alter the direction of bending are described, and to diminish the necessary bending force by creating a fluctuating melt pressure within the die.

21 Claims, 6 Drawing Sheets

METHODS AND APPARATUS FOR THE CONTINUOUS FORMATION OF AN EXTRUDED PRODUCT

FIELD OF THE INVENTION

This invention relates to methods and apparatus for the continuous formation of an extruded product consisting of any suitable extrudable material, but especially of materials comprising a plastics base. It relates particularly to methods of extrusion, and apparatus for carrying them out, as described in International patent publication No. WO 90/08024.

BACKGROUND OF THE INVENTION

More particularly still, it relates to means for extruding an elongated product of any section, but especially one of hollow section, having a bent or sinuous configuration. One known method of extruding a product of hollow section to such a configuration is described for instance in an article on pages 38–39 of "Elastomerics", March 1986, and essentially requires apparatus, referred to in the article as a "moving head extruder", in which the inner member of the die can move out of concentricity with the outer member in a carefully controlled manner. When the inner and outer members of the die are not concentric, so that they define between them an uneven annular gap that is thicker to one side of the extrusion axis than the other, extruded material leaves the die at an uneven speed, the parts of the periphery which correspond to the thinnest and thickest parts of the annular section travelling respectively slowest and quickest. This tends to induce in the product a bend in the axial plane which includes the two but displaced axes of the inner and outer die members, the outside of the bend corresponding to the part of the periphery where the material was travelling fastest on leaving the die. Obvious limitations of such a known process are that it applies only to dies which extrude a hollow product and which therefore include an inner die member, and also that the die is of variable geometry and the mechanism for supporting the inner member and controlling its translational movements relative to the outer one are necessarily relatively complex and costly. Also, such a process can only apply where the extrudate on leaving the die is not yet solid, but still strictly a very viscous fluid.

An example of another known kind of method for bending an extruded product is to be found in Patent Specification U.S. Pat. No. 3,748,077. In this example, when the leading end of the extrudate emerges from the die, it is received by a collar or clamp mounted at the free end of a pivoted arm. As the extrudate then continues to emerge from the die, the region engaged by the cap or clamp is constrained by the arm to follow a circular arc, so forming the extrudate into a bend. In such a process the entire force used to create the bend has to be provided by the extrusion ram, and the radius and direction of the bend are both fixed by the length of the arm and the location of its pivot. Also, although the cap or clamp is constrained to follow a circular arc, there is no guarantee that the final shape of the extrudate, following behind it, will conform accurately to the same arc.

Our invention arises firstly from appreciating that a variation, around the periphery of the product, of the velocity of the extrudate leaving a die may in appropriate circumstances be achieved more simply than as described in the "Elastomerics" article, in a way applicable to both hollow and non-hollow extrudates, and with a fixed-geometry die. Secondly, from appreciating that where a fixed-geometry die is used and bends are created by applying a constraint to the product after its surface has become solid, adequate control of both the radius and the direction of the bends requires that a second force, in addition to the extrusion force, must be generated and must act upon the extrudate so as to perform work upon it, over and above the work performed upon it by the extrusion force and upstream of where it becomes solid. Our invention is defined by the claims, the contents of which are to be read as included within the disclosure of this specification, and includes methods and apparatus as described with reference to the accompanying drawings.

BRIEF DESCRIPTION OF THE DRAWINGS

Embodiments of the invention will now be described by way of example with reference to the accompanying diagrammatic drawings in which.

DETAILED DESCRIPTION OF THE INVENTION

Figure 1:
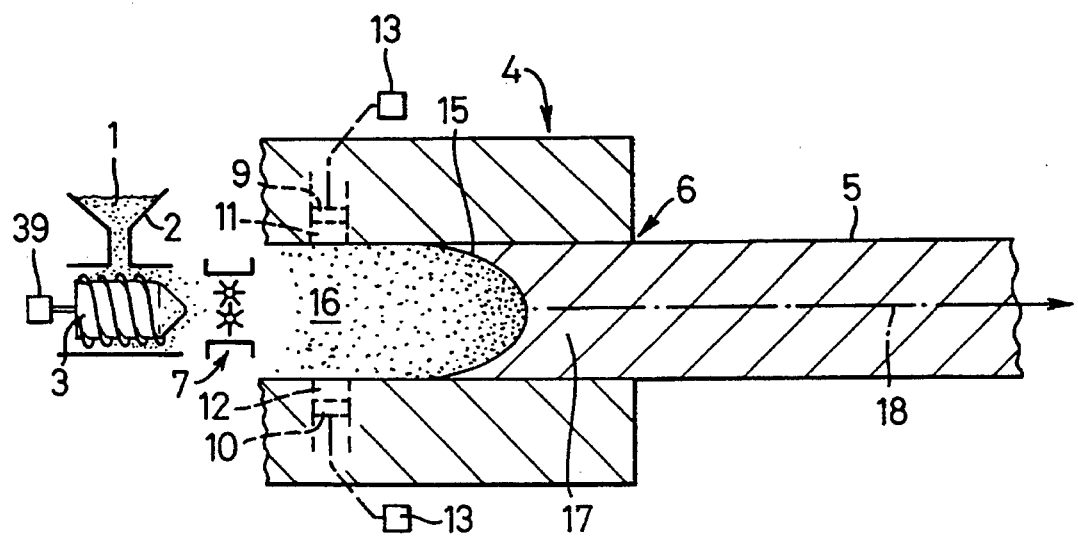
FIG. 1 is a section, taken during operation, through a die extruding a solid product according to the prior art.

FIG. 1 shows raw material 1, for instance of a plastics base such as polyethylene, polypropylene, nylon or other suitable thermoplastic, being delivered from a hopper 2 to an extruder screw 3 by which it is turned into a melt and extruded through a die 4, to emerge as an extrudate, i.e. a solid product 5, from the die outlet 6. The necessary, force to expel the extrudate from the die could be provided solely by the steady melt pressure generated by the screw 3. Alternatively that pressure could be supplemented in known fashion by a melt pump, built into the die: such a pump is shown in outline at 7. As a yet further alternative, the force— referred to in the claims as "the first force"— necessary to expel the extrudate from the die could be contributed, in part at least, by the reciprocation of a drivable member in communication with the material within the die. FIG. 1 shows two such members in the form of pistons 9, 10, working in cylinders 11 and 12 respectively, and driven and programmed (by means indicated schematically at 13) to execute related movements, in the manner described in WO 90/08024. As described in that document, at certain times in the programme both pistons may move inwardly towards the cavity of the die, so exerting force to help expel the extrudate, and at other times the pistons may reciprocate out of phase to promote beneficial characteristics in the product, as described in detail in that publication.

It should be particularly noted that such drivable members in general, and in particular pistons 9, 10 as shown, and as described in greater detail in WO 90/08024, communicate with the interior of the die downstream of the extrusion screw 3 and any possible associated devices (such as the melt pump 7), and therefore are in contact with the material (region 16) where it is fully molten. According to the present invention one particular advantage of reciprocating at least one such drivable member is that it promotes a fluctuating melt pressure within the die, varying between a peak value when the member is driven inwards and augments the force exerted on the melt by the screw (and pump, if present), and a minimum value when the member moves outwards. It would appear that the relaxation of melt pressure, as such a member retracts, promotes some slight shrinkage of the melt, leading to diminished resistance at the die outlet and thus easier expulsion of extrudate as the melt pressure then rises to its next peak value.

Figure 2:
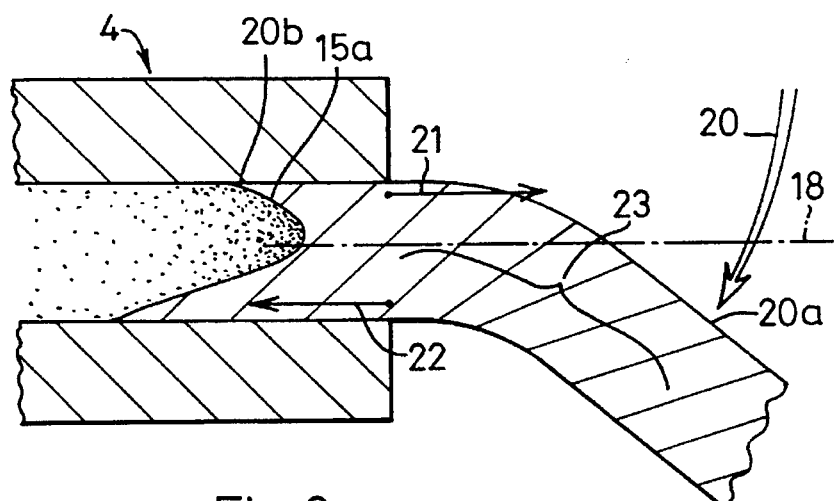
FIG. 2 is a similar section taken during the extrusion of a product according to the present invention.

In FIG. 1 reference 15 indicates, for an extrusion according to the present invention, the shape and general location of a typical interface that will be established in a steady state condition between the molten (16) and solid (17) material within the die cavity 14. Because the entire periphery of the product 5 is moving at the same velocity as it emerges from die outlet 6, item 5 emerges as a straight product with side walls parallel to the die axis 18, and interface 15 is symmetrical about axis 18, as seen both in the plane of FIG. 1 and in the plane at right angles. FIG. 2 shows what happens when, in accordance with the present Invention, a force 20 having a component transverse to the extrudate 5 is applied to it at a point (20a) downstream of the location where the outer surface of the extrudate solidifies. As shown in FIG. 2 that location (20b) lies within the structure of the die 4, but in other embodiments of the invention the location could coincide more nearly with the die outlet 6 but still within the die structure as a whole. Such a force sets up reaction, forces 21 and 22 and performs work upon the material being extruded, over and above the work performed by the total extrusion force within the die. The forces 21 augment the extrusion force towards the same side of the extrudate to which the force 20 is applied, and the reaction forces 22 oppose the extrusion forces towards the other side. The result is a distorted melt/solid interface 15a, and extrudate 5 leaves the die outlet at an uneven velocity, the velocity being greatest around that part of the periphery close to reaction forces 21 and least closest to forces 22. This causes the extrudate to take up a permanent bend, as shown, over the arc 23. If force 20 continues, the arc will extend. If force 20 ceases, the bend over arc 23 will remain, but extrudate subsequently leaving the die outlet 6 will emerge straight. It should be noted particularly that the diminished resistance to the expulsion of extrudate at the die outlet, obtainable by fluctuating melt pressure as already described, is of special significance and potential benefit where a bending force such as 20 is to be applied according to the invention. This is because the reaction forces 21, set up by the bending force on the outside of the bend, have to overcome the die outlet resistance. If that resistance is diminished, a lower bending force will suffice.

Figure 3:
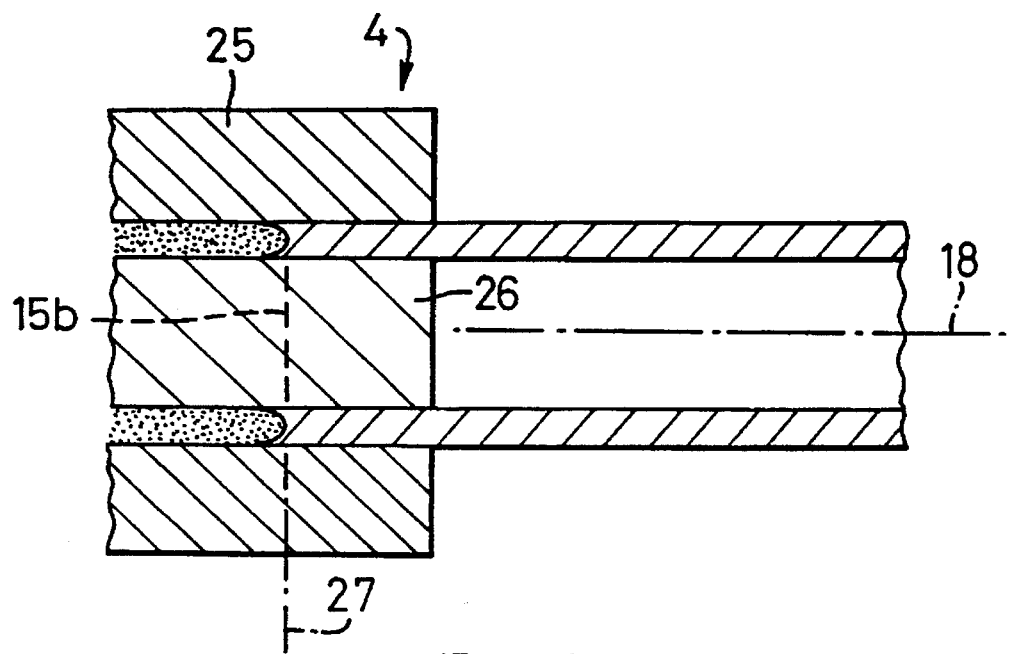
FIGS. 3 and 4 relate to products of hollow section, but are otherwise similar to FIGS. 1 and 2.
Figure 4:
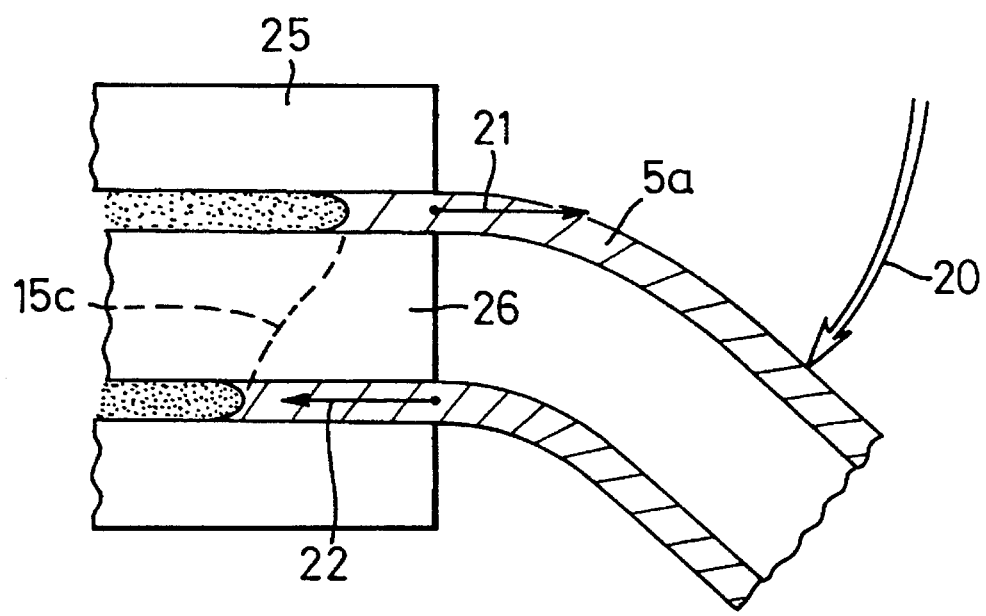

FIGS. 3 and 4 show the similar contrast for an extrudate 5a, of hollow section, extruded from a die 4 comprising relatively fixed outer 25 and inner 26 members, both coaxial with the die axis 18. The crest of the molten/solid interface 15b now lies in a transverse plane (27) when no sideways external load 20 is applied. When such a load is applied the interface 15c takes up the distorted shape shown in FIG. 4 being most forward closest to where the augmenting forces 21 are greatest, and most rearward closest to the greatest opposing forces 22.

Figure 5:
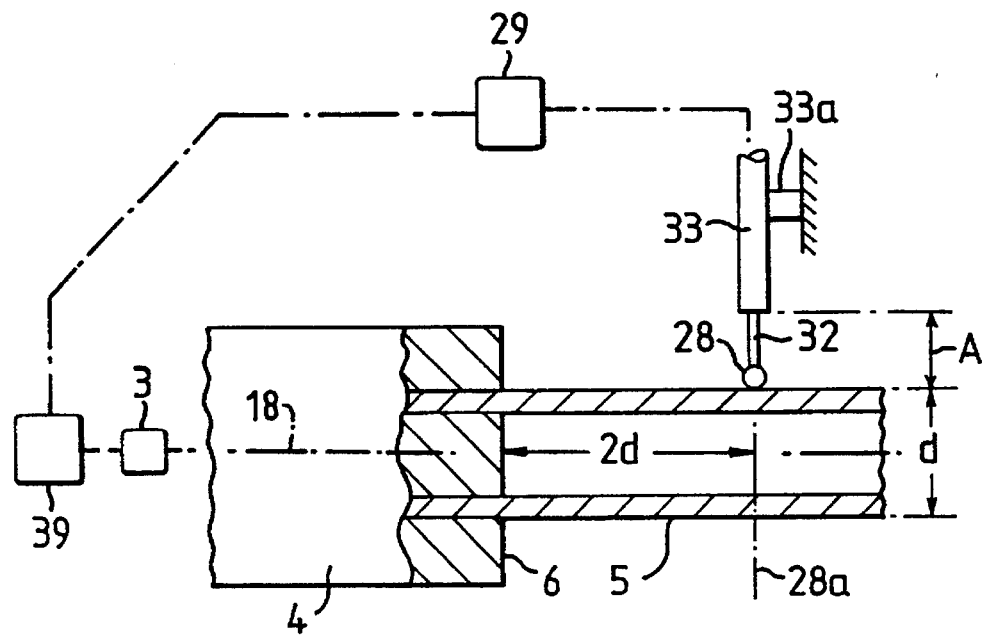
FIGS. 5 and 6 show apparatus features and dimensions associated with one method of extrusion generally according to FIG. 4.
Figure 6:
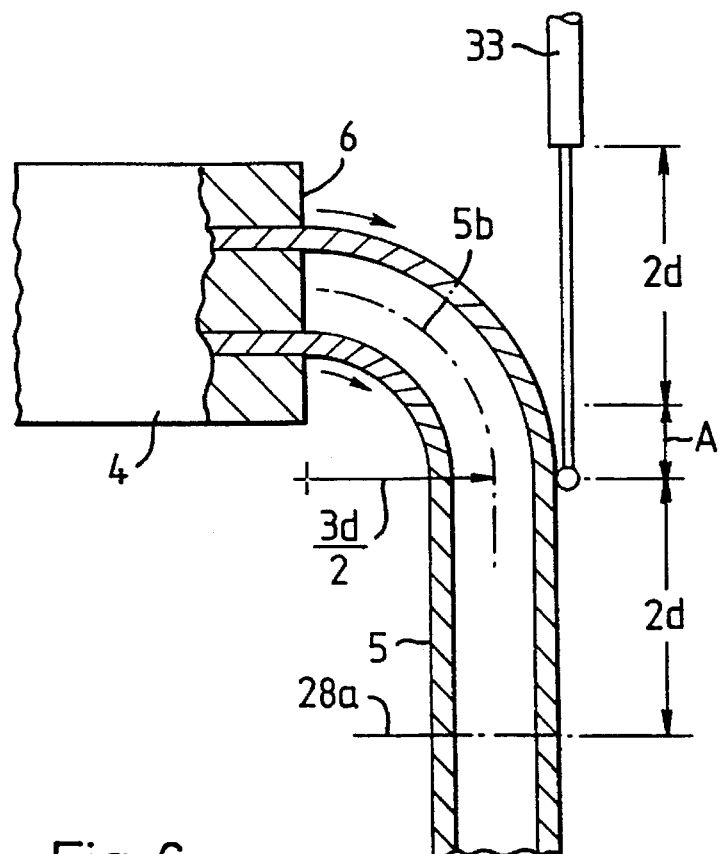

FIGS. 5 and 6 illustrate some of the dimensions and relative motions associated with a method of bending an extruded tube, as shown in outline in FIG. 4. The bending force 20 is applied to the surface of the extrudate 5 by contact with a roller plunger 28 mounted on the free end of a rod 32 driven by hydraulic ram 33 fixed in position at 33a. Plunger 28 may conveniently by contoured to match the curved outer surface of extrudate 5. Rod 32 lies at right angles to the die axis 18, and lies a distance 2d from the outlet 6 of die 4, where its the outer diameter of the extrudate. FIG. 5 shows the ram as a bending operation is about to begin, and where the contact of roller 28 with the extrudate lies a distance A forward of the ram body. During bending the ram 33 is programmed and driven (by control means indicated in outline at 29) to advance plunger 28 at a velocity which may be variable but is preferably constant (say VP). FIG. 6 shows the same items after the force exerted by plunger 28 against the extrudate has formed that extrudate into a right-angle bend in which the radius of curvature of the centre-line 5b is 3d/2. From FIG. 6 it is apparent, for the right-angle bend there shown, firstly that when the bend is complete, the extension of roller 28 forward of the ram body 33 will be (2d+A), and will thus have increased by 2d during the bending. Secondly that the section (28a) where the roller contacted the extrudate 5 in FIG. 5, at the start of bending, now lies a distance 2d forward of the roller, demonstrating that in this embodiment of the invention there is constant relative movement between the extrudate and the ram plunger. The roller form for that plunger is thus clearly appropriate. Thirdly that if VO and VI are the velocities at which extrudate leaves the die outlet 6 at the outer and inner radii of the bend respectively, as bending proceeds, then for equilibrium the following equations must be fulfilled:

$$VI = \frac{VO}{2}, \text{ and} \qquad (i)$$

$$\frac{VO}{VP} = \frac{\pi}{2} = 1.57 \text{ approx}, \qquad (ii)$$

and control means 29, acting also on the driving mechanism 39 of screw 3, must synchronise the screw with the ram to achieve this fulfilment.

It should be particularly noted that according to this aspect of the invention, this bend is achieved solely by limited area contact between the extrudate and a driven piston or other plunger. In contrast to the known method of bending an extrudate, as shown in specification U.S. Pat. No. 3,748,077, the ram 33 performs extra work on the extrudate, in addition to what is performed by the screw 3, and there is positive correlation between the movements and thus the work rates of the ram and the screw (via the common control means 29). Also, it is obviously a simple matter to vary the clearance (2d in FIGS. 5 and 6) between rod 32 and the die outlet 6, and thus to set the apparatus to form a bend of a greater radius. Further, by shortening the distance by which the plunger 28 is advanced during bending, it will of course be possible to form bends with an angle less than a right-angle.

With reference to FIGS. 5 and 6 it should finally be noted that the bends described are achieved by means only of the simple force of a driven plunger upon the surface of an extrudate that would otherwise have remained straight after leaving the die outlet 6. No bend formers, or other passive channels of curved shape, as shown for instance in prior patent specification U.S. Pat. Nos. 2,422,953 or 4,359,446, are necessary.

It should be noted that while FIG. 2 and all the other drawings show transverse forces being applied to the extrudate by direct contact between the solidified outer surface of that extrudate and a solid, piston-like member, other methods of carrying out the invention are possible. For instance, with a hollow extrudate as shown in FIGS. 3 and 4, provided the inner surface of the tip of the extrudate is sufficiently solid, the force could be applied by way of force-applying means adjustably inserted into the open forward end of the extrudate. Also, instead of being by way of solid-to-solid contact between a piston, lever or like component and a solid surface of the extrudate, the bending force could be applied in other ways. For instance, by a high pressure liquid or gaseous jet directed transversely at the extrudate surface, or even by non-contact means such as transverse magnetic attraction or repulsion upon an extrudate of a composition which itself responds to such forces, or which contains constituents that do. In its broadest aspect, the invention requires only that forces are applied to the extrudate, once it has solidified sufficiently, so as to exert a bending couple upon it.

Figure 7:
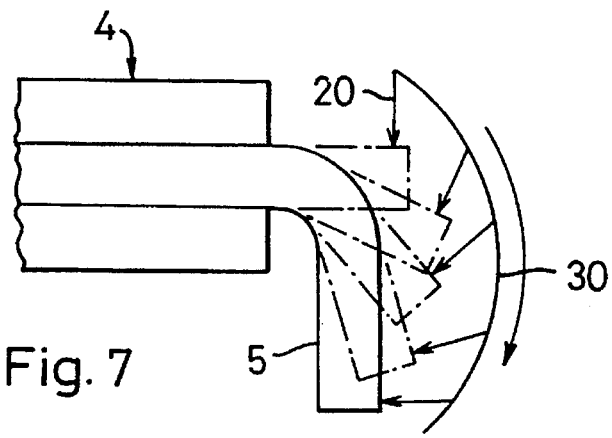
FIG. 7 schematically shows another method of carrying out the present invention.
Figure 8:
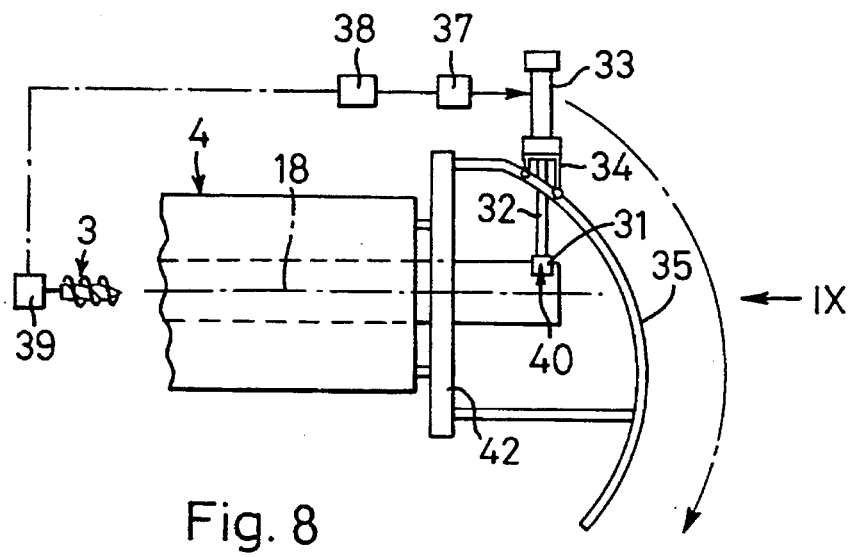
FIG. 8 is an elevation of apparatus for carrying out the method of FIG. 7.
Figure 9:
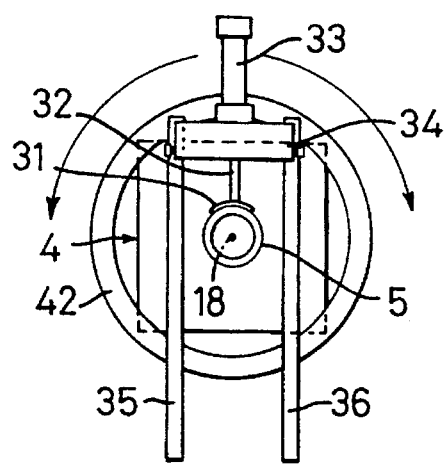
FIG. 9 is a view in the direction of arrow IX in FIG. 8.

FIGS. 7 to 9 illustrate in principle another way in which the method according to the invention, as described with reference to FIG. 2, may be extended to bend the extrudate 5 into a full right-angle. In the embodiment of FIGS. 5 and 6 the body of the ram 33 was held stationary, and the point of contact between the plunger 28 and the extrudate changed substantially and continuously as bending proceeded. As the extrudate 5 emerges continuously from the die outlet 6 in the embodiment of FIGS. 7 to 9, the source of the bending force 20 moves simultaneously along a track 30. The shape of the track may be matched to the extrusion speed so that the point of application of the force to the extrudate undergoes less change, indeed theoretically no change, and a continuous bending force is applied at a more constant point. FIGS. 7 and 8 show in outline some mechanical components by which this method could be achieved. Here as in FIGS. 3 to 6 a hollow product 5a is being produced, and the bending action is now exerted by a piston head 31 which may again be a roller (like item 28) but which, because of less movement relative to the product during a bending operation, may for instance simply be arc-shaped to match the curvature of that surface. Again the head 31 is mounted on the rod 32 and driven by ram 33. The ram is mounted, by way of supporting arms 34, on two rails 35, 36 which constitute the track 30 of FIG. 7 and are mounted on a ring-shaped mounting bracket 42 which is rotatably attached to the die by means not shown, so that the direction of bend can be altered by rotating the bracket 42 relative to the die. The driving means 37 both control the operation of ram 33 and traverse it around the track 30 as the extrudate 5 emerges from the die, and the control means 38 synchronise the driving mechanism 37 with the corresponding mechanism 39 of the screw 3 to ensure that the location of the point of application 40 of piston 31 with the extrudate 5 is controlled as desired.

The ram 33 of the embodiment of FIGS. 5 and 6 could also be mounted on a ring bracket 42, or otherwise similarly to the same ram in FIGS. 7 to 9, so as to facilitate altering the direction of bending.

Figure 10:
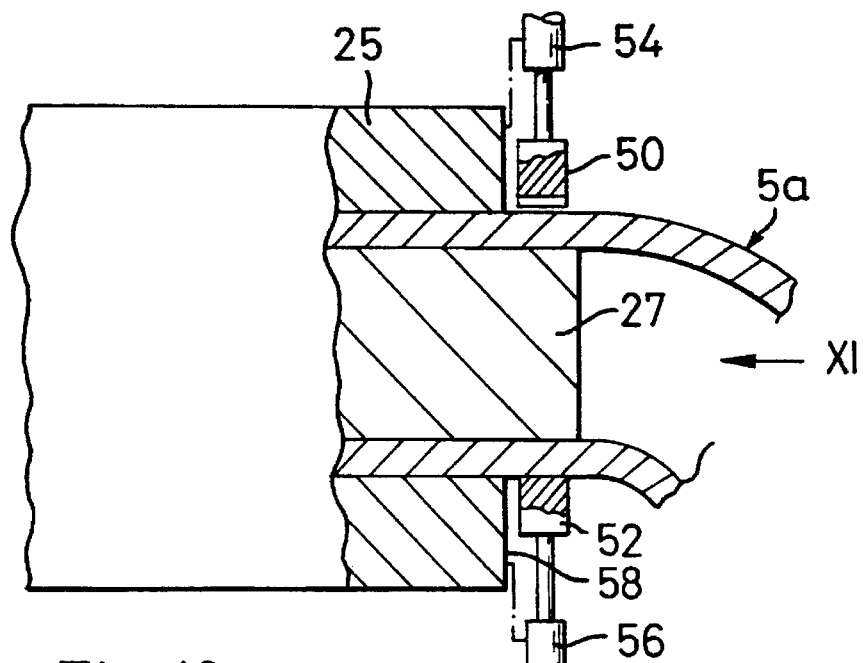
FIG. 10 is a section through a die for extruding a hollow product, and for carrying out the method of the invention in another way.
Figure 11:
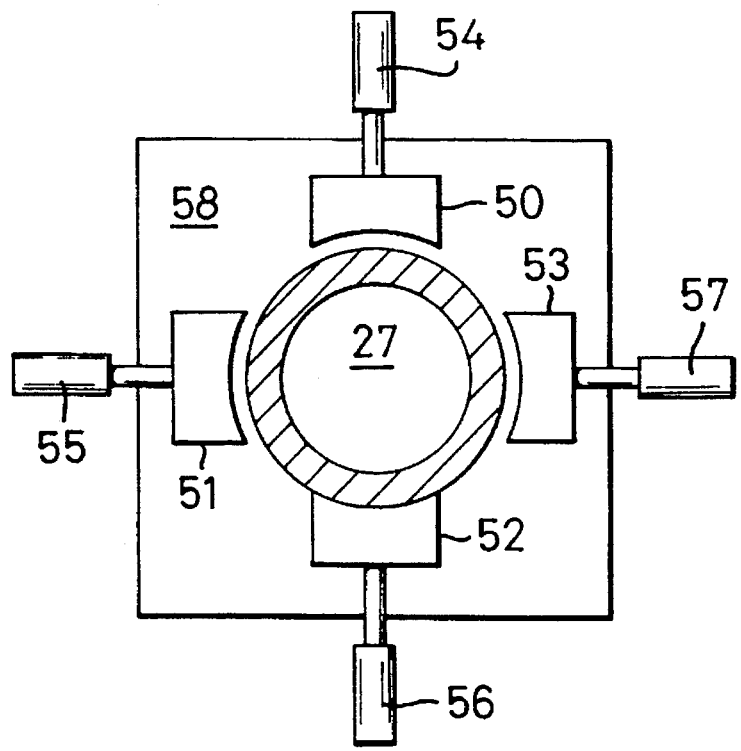
FIG. 11 is a view in the direction of the arrow XI in FIG. 10.

As already indicated, the force exerted on the extrudate 5 in FIGS. 5 to 9 tends to speed up the exit of material from the die outlet 6 on that side of the extrudate where the force is applied, and slow down the exit on the opposite side. Items 28, 31 therefore make contact with the extrudate on the outside of the bend that is formed. In FIGS. 10 and 11 four pistons 50–53, driven by cylinders 54–57 respectively, are fixed to the outlet face 58 of the die, and therefore bear upon the surface of the hollow extrudate 5a immediately adjacent the die outlet 6. There is thus considerable relative movement between these pistons and the extrudate, during operation, as there was between the extrudate and the plunger 28 in the FIGS. 5 and 6. Moreover, as FIG. 10 shows, the inner member 27 of the die now projects axially beyond the end face 58 of the outer member 25, so that whenever one of the pistons 50–53 exerts a dynamic force and performs work on it, the extrudate is gripped between that piston and the extending part of inner member 27. Four pistons 50–53 are provided simply to facilitate bending the extrudate 5 in any direction by appropriate balancing of the actions of the four pistons. When one of the pistons is now activated, for instance piston 52 as shown, the result is to impose a frictional restraint upon the part of the extrudate gripped between that piston and the inner member 27. The speed of exit of the extrudate at that point around its periphery is therefore retarded relative to the speed at the opposite part (i.e. where piston 50 is located) and the extrudate bends so that the activated piston lies on the inside of the bend.

Figure 12:
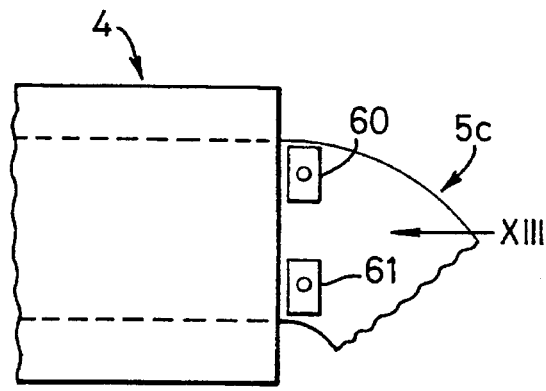
FIG. 12 is a plan view of apparatus for applying the method of the invention to the extrusion of a strip-like form.
Figure 13:
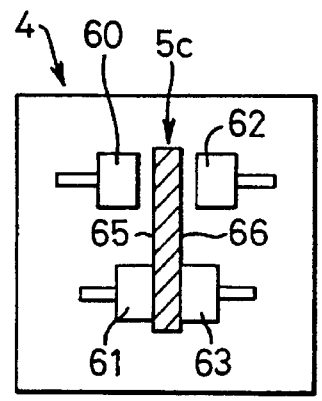
FIG. 13 is a view in the direction of the arrow XIII in FIG. 12.

FIGS. 12 to 15 show proposed apparatus, according to the invention, for extruding and bending a product 5c of strip-like form. As in FIGS. 10 and 11 there are again four pistons (60–63) but now two of them (60, 61) bear against one (65) of the long sides of the cross-section of the product, and the other two (62, 63) in corresponding locations against the other side 66, so that pistons 60, 62 and 61, 63 are aligned with each other. If now pistons 60, 62 are inoperative but pistons 61, 63 are active, as shown in FIG. 13, the speed of exit of the extruded material from die outlet 6 will be slowed down by friction towards the side of the strip where piston 61, 63 are located, and relatively raised—provided the operation of screw 3 is unchanged, and the same total volume of material continues to leave outlet 6 in unit time—towards the other side where rams 60, 62 are inoperative. As shown in FIG. 12, a right-hand bend of the strip 5c, in the planes of its long sides 65 and 66, is therefore promoted, with the active and friction-creating pistons 61 and 63 on the inside of the bend.

Figure 14:
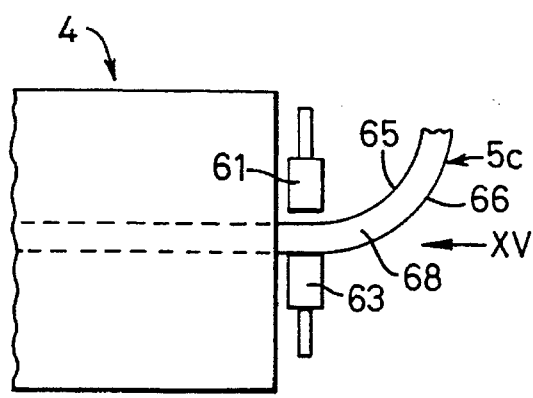
FIG. 14 is a side elevation of the apparatus of FIG. 12 working in an alternative fashion.
Figure 15:
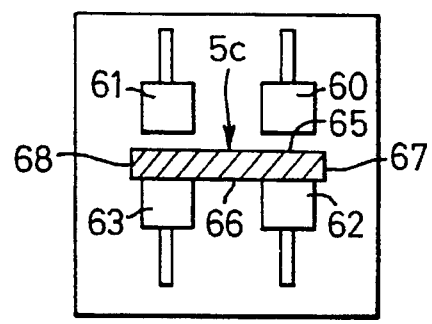
FIG. 15 is a view in the direction of the arrow XV in FIG. 14.

FIGS. 14 and 15 illustrate the different effect that results when pistons 62 and 63, both of which engage with the same long side 66 of the extrudate, are activated, and the other two pistons 60 and 61 are idle. The force of pistons 62, 63 on side 66 has the effect of speeding up the speed of exit of the material from the die mouth 6 on this side of the strip. The reaction between the product and pistons 62, 63 depends not upon pistons 60 and 61, both of which remain out of contact with the product, but upon the support of the product by the adjacent structure of the die 4. The result is that the strip bends in a plane lying parallel to the short sides 67, 68 of the product section, with the active pistons (as shown 62, 63) on the outside of the bend.

It should be noted that while reciprocating hydraulic rams have been shown as the means for applying the bending forces in all illustrated examples, other forms of physically-contacting force-applying means—for instance driven screw-operated plungers—are possible, in addition to non-contacting means of which some examples have already been given. It should also be noted that while FIGS. 7 to 9 showed embodiments of the invention in which the point of application of the bending force possibly moved little relative to the extrudate but considerably relative to the die, and FIGS. 5, 6 and 10–15 the converse case where the points of application of the bending forces were fixed relative to the die, the invention also includes bending methods and apparatus in which the point or points at which the bending force is applied to the extrudate may move substantially relative both to the extrudate and to the die.

We claim:

1. A method for the continuous formation of an extruded product, comprising:

causing a first force-generating means to generate a force to perform work upon material to extrude it through a die having a die outlet, at least the outer surface of the extrudate being solid as it leaves the die outlet;

causing a second force-generating means to apply a second force to the extrudate at a point of application downstream of said die outlet and where its surface becomes solid and in a direction having at least a component transverse to the direction in which said extrudate is moving at said point of application, and by that second force causing the speed of the extrudate leaving the die outlet over a first part of the periphery of its cross-section to exceed the speed over another part of that cross-section, whereby causing the extrudate to form into a permanent bend, the inner and outer radii of which correspond to the parts of the periphery moving at the relatively lesser and greater speed respectively characterised in that the second force performs further work upon the material, in addition to the work performed by the force generated by the first force-generating means.

2. A method according to claim 1 in which the second force is applied by solid-to-solid contact between the second force-generating means and the outer surface of the extrudate.

3. A method according to claim 1 in which a surface of interface between liquid and solid material exists wholly within the die, and the application of the second force distorts the geometry of that surface.

4. A method according to claim 1 in which the second force-applying means are fixed relative to the die, and in which the effect of the second force is to retard the part of the extrudate periphery to which it is applied relative to other parts of that periphery.

5. A method according to claim 1 in which the second force contains a component parallel to the direction in which the extrudate is moving where the second force is applied, whereby the second force tends to increase the speed at which the part of the periphery of the extrudate corresponding to where it is applied is leaving the die outlet.

6. A method according to claim 1 in which the point of application of the second force moves, relative to the die, during the application of that force.

7. A method according to claim 1 in which the point of application of the second force to the extrudate changes as bending proceeds.

8. A method according to claim 1 in which the second force Is applied to the extrudate without the use of any curved bend former.

9. A method according to claim 3 in which the pressure of the liquid material within the die is caused to fluctuate.

10. A method according to claim 9 in which the pressure fluctuation is caused by exposing the liquid material within the die to at least one reciprocating driven member.

11. A method according to claim 10 in which there are at least two such reciprocating driven members, programmed to execute related movements.

12. Apparatus for carrying out a method of continuous formation of an extruded product including the steps of causing a first force-generating means to generate a force to perform work upon material to extrude it through a die having a die outlet, at least the outer surface of the extrudate being solid as it leaves the die outlet;

causing a second force-generating means to apply a second force to the extrudate at a point of application downstream of said die outlet and where its surface becomes solid and in a direction having at least a component transverse to the direction in which said extrudate is moving at said point of application, and by that second force causing the speed of the extrudate leaving the die outlet over a first part of the periphery of its cross-section to exceed the speed over another part of that cross-section, whereby causing the extrudate to form into a permanent bend, the inner and outer radii of which correspond to the parts of the periphery moving at the relatively lesser and greater speed respectively and where the second force performs further work upon the material, in addition to the work performed by the force generated by the first force-generating means, said apparatus comprising an extrusion die presenting a die outlet, and at least one said force-generating means located downstream of said die outlet and transversely of the extrudate, and operable to generate a bending force to act upon the extrudate.

13. Apparatus according to claim 12 in which the force generating means includes a piston-like member operable to bear upon the extrudate surface while permitting relative movement between member and surface in use.

14. Apparatus according to claim 13 in which at least two pistons are mounted to bear against the surface of the extrudate, and are spaced-apart from each other around the extrudate periphery, whereby by differential operation of the pistons the extrudate can be caused to bend in different directions.

15. Apparatus according to claim 12 in which the force-generating means is mounted to move.

16. Apparatus according to claim 12 in which the force-generating means is fixed relative to the die outlet.

17. Apparatus according to claim 12 in which the generated force acts upon the extrudate transversely relation to the die axis.

18. Apparatus according to claim 12 in which the generated force acts upon the extrudate in a direction having a component parallel to the die axis.

19. Apparatus according to claim 13 in which the piston-like member includes a roller by which it makes contact with the extrudate surface.

20. Apparatus according to claim 12 including at least one driven reciprocable member, communicating with the interior of the extrusion die, and operable to promote a fluctuating pressure in the liquid material within the die.

21. The apparatus as claimed in claim 12 wherein said die outlet has a fixed cross-section.

* * * * *